United States Patent [19]

Molari, Jr.

[11] 4,312,903
[45] Jan. 26, 1982

[54] IMPACT RESISTANT DOUBLE GLAZED STRUCTURE

[75] Inventor: Richard E. Molari, Jr., Pittsfield, Mass.

[73] Assignee: General Electric Company, Pittsfield, Mass.

[21] Appl. No.: 127,807

[22] Filed: Mar. 5, 1980

[51] Int. Cl.³ .......................... E06B 3/24; B32B 9/04; B32B 27/36

[52] U.S. Cl. ........................................ 428/34; 52/788; 52/789; 52/790; 428/213; 428/215; 428/216; 428/412; 428/437; 428/426; 428/442; 428/447; 428/522; 428/911

[58] Field of Search ................. 428/437, 34, 412, 911, 428/447, 426, 522, 442, 213, 215, 216; 52/788, 789, 790, 309.3, 309.13; 89/36 L

[56] References Cited

U.S. PATENT DOCUMENTS

| | | | |
|---|---|---|---|
| 3,520,768 | 7/1970 | Peilstöcker | 428/332 |
| 3,624,238 | 11/1971 | McKenzie | 428/412 |
| 3,630,814 | 12/1971 | Arnold | 428/34 |
| 3,657,057 | 4/1972 | Shorr | 428/441 |
| 3,666,614 | 5/1972 | Snedeker | 428/442 |
| 4,027,072 | 5/1977 | Molari, Jr. | 428/412 |
| 4,123,588 | 10/1978 | Molari, Jr. | 428/412 |
| 4,126,730 | 11/1978 | Molari, Jr. | 428/412 |
| 4,198,468 | 4/1980 | Molari, Jr. | 428/412 |
| 4,243,719 | 1/1981 | Holmes | 428/412 |

FOREIGN PATENT DOCUMENTS 1504198   3/1978   United Kingdom .

*Primary Examiner*—Ellis P. Robinson
*Attorney, Agent, or Firm*—William F. Mufatti

[57] ABSTRACT

An improved impact resistant double glazed structure comprising a back laminate positioned opposite the direction of impact, said back laminate comprising a plurality of laminae selected from polycarbonate, glass and solid resinous materials, and a front glass laminate positioned forward of said back laminate comprising a plurality of glass laminae, including a relatively thin front glass lamina facing the direction of impact having a thickness of from about 30 to about 220 mils, a relatively thin back glass lamina opposite the direction of impact having a thickness of from 30 to about 220 mils, and a relatively thicker glass core positioned intermediate said relatively thin back and front glass laminae.

29 Claims, 2 Drawing Figures

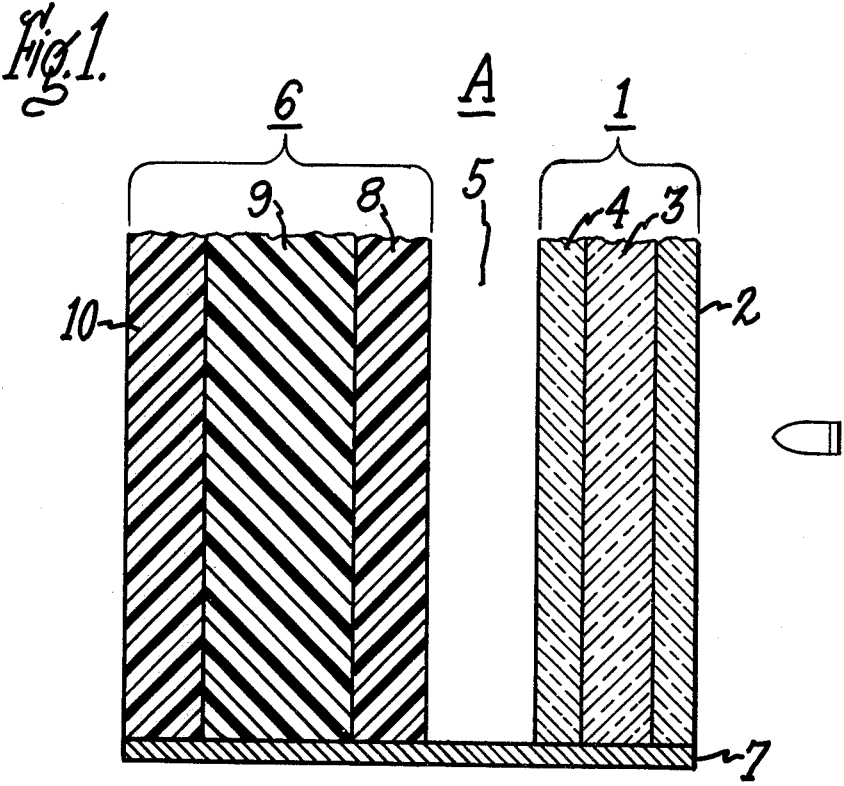
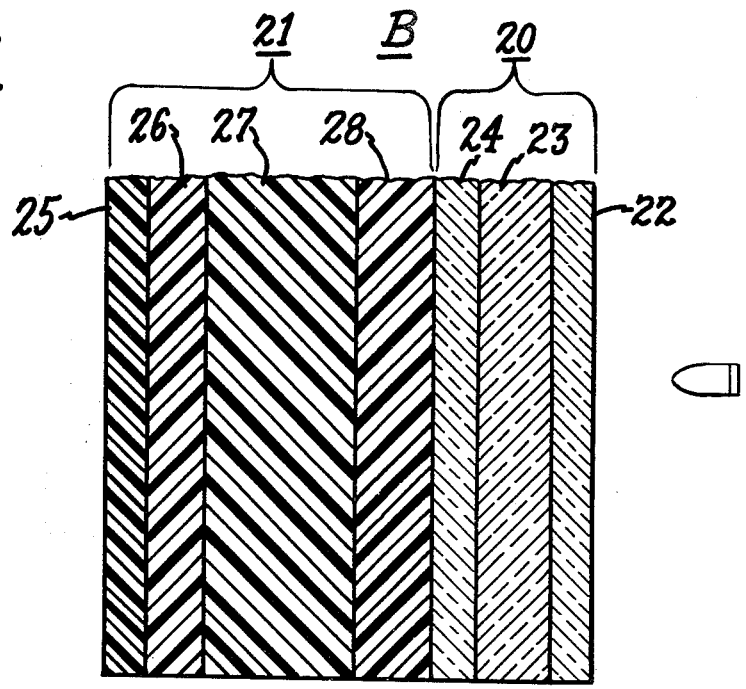

IMPACT RESISTANT DOUBLE GLAZED STRUCTURE

This invention relates to impact resistant laminates. More particularly, it relates to bullet resistant double glazed structures offering protection against multiple shots from high power handguns and rifles. The improved double glazed structure includes a back laminate positioned opposite the direction of impact or shock, said back laminate containing a plurality of laminae selected from the group consisting of polycarbonate, glass and solid resinous materials, said laminae of said back laminate being bonded together by a compatible adhesive, and a front laminate positioned forward of said back laminate respective to the direction of impact, said front laminate comprising a plurality of glass laminae, including a front glass lamina having a thickness of from about 30 to about 220 mils, facing the direction of impact, a back glass lamina having a thickness of from about 30 to about 220 mils opposite the direction of impact and at least one relatively thick inner glass lamina positioned intermediate said front and back glass laminae, said glass laminae of said front laminate being bonded together by a compatible adhesive.

BACKGROUND OF THE INVENTION

The use of so-called safety glazing or penetration resistant glazing for windows, windshields and the like using multiple layers of polycarbonate, glass, and other resinous materials is well known. For example, glass polycarbonate resin laminates are described in U.S. Pat. No. 3,666,614, the glass and polycarbonate being cohered together using an ethylene-vinyl copolymer. In U.S. Pat. No. 3,520,768, there are described laminates of relatively thick glass having a comparatively thin polycarbonate foil as the cohering material. It is also known, as described in U.S. Pat. No. 4,027,072, to utilize certain polysiloxane-polycarbonate block copolymers as an adhesive in preparing polycarbonate containing laminates. While generally useful, these laminates suffer from an inability to withstand multiple shots, especially when struck by high velocity bullets, such as those fired from rifles. Thus, for example, in prior art laminates utilizing thick forward facing (impact receiving) glass plies, multiple shots at the thick glass front ply cause much glass cracking and removal of glass from the laminated structure making it vulnerable to repeat hits. In order to withstand multiple high velocity bullet strikes, especially high velocity rifle bullets, the heretofore known laminates had to be extremely thick and heavy. Even these thick and heavy laminates were not entirely successful since spalling on the back or downstream face of said laminates occurred with the resultant danger of injury due to this spalling to persons behind these laminates. Thus, there is a need for laminates which are relatively thin, are lightweight, and are able to withstand repeated hits by high velocity bullets.

The present invention provides a laminate structure which has relatively light weight, is relatively thin, and yet is capable of withstanding repeated high velocity bullet strikes without bullet penetration or spalling of the back or downstream layer.

BRIEF DESCRIPTION OF THE DRAWINGS

FIG. 1 is a side view of the double glazed structure of the present invention wherein there is an intermediate air space between the back laminate and the front glass laminate.

FIG. 2 is a side view of the double glazed structure of the present invention wherein the back laminate is adjacent to and in contact with the front glass laminate.

DESCRIPTION OF THE INVENTION

The present invention comprises an improved impact resistant double glazed structure comprising a back laminate positioned opposite the direction of impact, said back laminate comprising a plurality of laminae selected from the group consisting of polycarbonate, glass and solid resinous materials, said laminae of said back laminate being bonded together by a compatible adhesive; the improvement comprising a front laminate positioned forward of said back laminate respective to the direction of impact, said front laminate comprising a plurality of glass laminae, including a front glass lamina having a thickness of from about 30 to about 220 mils, facing the direction of impact, a back glass lamina having a thickness of from about 30 to about 220 mils opposite the direction of impact and a relatively thick glass core positioned intermediate said front and back glass laminae, said glass laminae of said front laminate being bonded together by a compatible adhesive.

The thickness of the front and back glass laminae in the front glass laminate is critical. The upper thickness range of these front and back glass laminae should be about 220 mils. If these front and back glass laminae are thicker than about 220 mils, the resistance of the double glazed structure to multiple shots is deleteriously affected. The lower range of thickness of these front and back glass laminae is not critical but is limited only by practical considerations. For ease of handling and optical properties, this lower range is about 30 mils. It is also important that the inner glass core disposed intermediate said front and back glass laminae be relatively thick, i.e., thicker than either the front or back glass laminae. This inner glass core should generally be thicker than about 250 mils and may consist of a monolithic ply of glass or several glass plies bonded together by a compatible adhesive. Any of the usual types of glass used in so-called safety applications can be used as the glass laminae in the front glass laminate of the present invention including coated or uncoated and chemically and thermally strengthened or tempered glass as well as common untempered glass.

The improved double glazed structures of the instant invention are illustrated in FIGS. 1 and 2. FIG. 1 illustrates one embodiment of the double glazed structure of the present invention. In this embodiment, the double glazed structure A is comprised of a back laminate 6 and a front glass laminate 1 positioned forward of said back laminate respective to the direction of impact, the front laminate 1 being spaced apart from the back laminate 6 by an air space 5. The back laminate 6 is comprised of a plurality of laminae 8, 9, 10 selected from the group consisting of polycarbonate, glass and solid resinous materials. The front glass laminate 1 is comprised of a relatively thin front glass lamina 2 having a thickness of from about 30 to about 220 mils, a relatively thin back glass lamina 4 having a thickness of from about 30 to about 220 mils, and a relatively thick inner glass core 3 disposed intermediate the front glass lamina 2 and the back glass lamina 4. The inner glass core is thicker than either the front 2 or back 4 glass laminae and generally has a thickness greater than 250 mils and preferably greater than about 350 mils. The upper range of thickness of the inner glass core 3 is limited only by practical considerations of thickness and weight of the glass laminate 1 and correspondingly of structure A. Preferably, the thickness of the inner core 3 ranges from about 220 mils to about 1000 mils when said inner core is a single monolithic glass lamina.

The inner core 3 may consist of a single monolithic lamina of glass or it may consist of a plurality of glass laminae bonded together by a compatible adhesive. The front glass lamina 2 and the back glass lamina 4 are bonded to the inner glass core by a compatible adhesive.

Although in FIG. 1 the back laminate 6 is shown as being comprised of three laminae, it need not contain three laminae. It may contain only two laminae or it may contain more than 3 laminae. Back laminate 6 is comprised of a plurality of laminae selected from glass, polycarbonate and solid resinous materials. Preferably, the back laminate 6 contains at least one polycarbonate lamina and at least one lamina selected from the group consisting of glass and resinous material. Thus, for example, the back laminate can contain a polycarbonate lamina bonded to an acrylic lamina, two polycarbonate laminae bonded to each other, a polycarbonate lamina bonded to an acrylic lamina which is in turn bonded to another polycarbonate lamina, a glass lamina bonded to a polycarbonate lamina, or a polycarbonate lamina bonded to an acrylic lamina which is in turn bonded to a glass lamina. One useful type of back laminate 6 is one wherein all of the laminae therein are polycarbonate. The back laminate 6 can comprise any of the bullet resistant laminates known in the art. Some suitable types of back laminate 6 which can be used in the instant invention are described in U.S. Pat. No. 4,027,072, U.S. Pat. No. 4,123,588, U.S. Pat. No. 4,126,730, U.S. Pat. No. 3,624,238 and U.S. Pat. No. 3,657,057, all of which are incorporated herein by reference.

In the embodiment illustrated by FIG. 1, the front laminate 1 is separated from the back laminate 6 by air space 5. The distance that the back laminate 6 is separated from front laminate 1 can vary over a broad range and one of its purposes is to improve the optical characteristic of the double-glazed laminate structure A. Generally, the air space 5 has a width of from about 1/10 to about 3/4 of an inch, preferably from about 1/8 to about 1/2 of an inch.

Frame number 7 is not critical to the effective use of structure A, but is used for promoting facile handling and manipulation thereof, and to generally reinforce and protect said structure.

In a more preferred embodiment of the instant invention illustrated by FIG. 1, the back laminate 6 of laminate structure A is comprised of a plurality of impact receiving layers selected from the group consisting of polycarbonates, glasses, and solid resinous materials, including a back polycarbonate lamina opposite the direction of impact or shock, said back polycarbonate lamina having on its exposed surface opposite the direction of impact a mar-resistant coating less than 2 mils thick and which is harder and relatively more brittle than the underlying polycarbonate lamina, said back polycarbonate lamina having a thickness from about 30 mils to about 220 mils. When this type of laminate is used as back laminate 6 in the double glazed structure A, the structure A is found to be not only resistant to penetration by multiple strikes of high velocity bullets, but also has greatly improved spall resistance. Such laminates are described in applicant's copending application Ser. No. 862,775, filed Dec. 21, 1977, which is incorporated herein by reference. Briefly, in these laminates, i.e., the back laminates 6 having the coated back polycarbonate ply having a thickness of from about 30 to about 220 mils, it has been found that the notch sensitivity of the back polycarbonate lamina coated with a relatively brittle coating is substantially reduced if the thickness of such lamina is restricted to less than about 220 mils and preferably from about 30 to 150 mils. The minimum thickness of the polycarbonate back-ply is restricted only by current coating application technology and maintenance of good optics of the coated product. Thicknesses less than about 30 mils tend to be somewhat impractical. The upper range of thickness, i.e., 220 mils, of the coated back polycarbonate lamina is critical in providing improved spall resistance. If the coated back polycarbonate lamina is thicker than about 220 mils, there is no noticeable improvement in the spall resistance of structure A.

Another embodiment of the instant invention is the double glazed structure B illustrated in FIG. 2. In this embodiment, the double glazed structure B is comprised of a back laminate 21 positioned opposite the direction of impact, said back laminate comprising a plurality of laminae selected from polycarbonate, glass and solid resinous materials, and a front glass laminate 20 positioned forward of said back laminate 21 comprising a plurality of glass laminae, including a relatively thin front glass lamina 22 facing the direction of impact having a thickness of from about 30 to about 220 mils, a relatively thin back glass lamina 24 opposite the direction of impact having a thickness of from 30 to about 220 mils, and a relatively thicker glass core 23 positioned intermediate said relatively thin back 24 and front 22 glass laminae. In this embodiment, the surface of the lamina 28 in said back laminate 21 closest to or facing the direction of impact is adjacent to and in surface-to-surface contact with the surface of said back glass lamina 24 of said front glass laminate 20.

In the embodiment of the double glazed structure illustrated in FIG. 2, the front laminates 20 and the back laminates 21 are the same as the front laminates 1 and the back laminates 6, respectively, illustrated in FIG. 1. The difference between the double glazed structure A illustrated in FIG. 1 and the double glazed structure B illustrated in FIG. 2 lies in the fact that in the double glazed structure of FIG. 2 there is no air space separating front laminate 20 from the back laminate 21. Rather, front laminate 20 and back laminate 21 are adjacent to and in surface-to-surface contact with each other. While front laminate 20 may be bonded to back laminate 21 by a compatible adhesive, it is preferred that front laminate 20 is not bonded to back laminate 21 but is merely in physical surface-to-surface contact with back laminate 21.

As in the embodiment of FIG. 1, it is critical that the front glass lamina 22 and the back glass lamina 24 have a thickness of from about 30 to about 220 mils and that the inner glass core 23 be thicker than either said front glass lamina 22 or said back glass lamina 24. The inner glass core 23 generally has a thickness greater than about 250 mils and can contain either a single monolithic glass lamina or a plurality of glass laminae bonded together by a compatible adhesive.

While laminate 21 is shown in FIG. 2 to contain 4 plies, this, as discussed with respect to laminate 6 shown in FIG. 1, need not be the sole case. Thus, as with laminate 6, laminate 21 can contain less than 4 plies, i.e., 2 or 3 plies, or more than 4 plies. Laminate 21 is comprised of a plurality of laminae selected from glass, polycarbonate and solid resinous materials. Preferably, the back laminate 21 contains at least one polycarbonate lamina and at least one lamina selected from the group consisting of glass and resinous material. Thus, for example, the back laminate can contain a polycarbonate lamina bonded to an acrylic lamina, two polycarbonate laminae bonded to each other, a polycarbonate lamina bonded to an acrylic lamina which is in turn bonded to another polycarbonate lamina, a glass lamina bonded to a polycarbonate lamina, or a polycarbonate lamina bonded to an acrylic lamina which is in turn bonded to a glass lamina. One useful type of back laminate 21 is one wherein all of the laminae therein are polycarbonate. As is the case with laminate 6 of FIG. 1, laminate 21 can be any of the bullet resistant laminates known in the art and described in U.S. Pat. No. 4,027,072, U.S. Pat. No. 4,123,588, U.S. Pat. No. 4,120,730, U.S. Pat. No. 3,624,238, U.S. Pat. No. 3,657,057, and in applicants' copending application Ser. No. 862,775, filed Dec. 21, 1977, all of which are incorporated herein by reference.

In a more preferred embodiment of the instant invention illustrated by FIG. 2, the back laminate 21 of structure B is comprised of a plurality of impact receiving layers selected from the group consisting of polycarbonates, glasses, and solid resinous materials, including a back polycarbonate lamina opposite the direction of impact or shock, said back polycarbonate lamina having on its exposed surface opposite the direction of impact a mar-resistant coating less than 2 mils thick and which is harder and relatively more brittle than the underlying polycarbonate lamina, said back polycarbonate lamina having a thickness from about 30 mils to about 220 mils. When this type of laminate is used as back laminate 21 in the double glazed structure B, the structure B is found to be not only resistant to penetration by multiple strikes of high velocity bullets, but also has greatly improved spall resistance. In this embodiment, lamina 25 of laminate 21 is a back polycarbonate lamina having a thickness of from about 30 to about 220 mils and having a mar-resistant coating less than 2 mils thick and which is harder and relatively more brittle than the underlying polycarbonate lamina on its exposed surface opposite the direction of impact. When this type of laminate is used as back laminate 21 in the double glazed structure B, the structure B is found to be not only resistant to penetration by multiple strikes of high velocity bullets, but also has greatly improved spall resistance.

In both the preferred embodiments, i.e., wherein the back lamina of laminates 6 and 21 is a polycarbonate lamina havng a thickness of from about 30 to about 220 mils and has a mar-resistant coating on the exposed surface of the polycarbonate lamina opposite the direction of impact, the mar-resistant, hard and brittle coating has a brittleness and hardness effective to protect the underlying polycarbonate from abrasion, marring, and scratching. Such mar-resistant coatings are known in the art and include metal oxides, modified melamines; ultraviolet hardenable organics such as acrylated monomers or mixtures of these monomers with acrylate-modified polymeric resins such as acrylate modified polyurethanes; inorganic glasses such as silica or alumina; polyurethanes; silicone resins; silicone resins with recurring organic groups such as polymethyl acrylate or methacrylate; silica, such as colloidal silica, filled silicone resins; silicone resins derived from epoxy terminated silanes; polyamide ester resins, and melamine based coatings.

Preferred mar-resistant coatings are the silicone resins, particularly the colloidal silica filled silicone resins, and melamine based coatings. The colloidal silica filled silicone resin type mar-resistant coatings are described in U.S. Pat. Nos. 4,027,073 and 4,159,206, all of which patents are hereby incorporated by reference.

These mar-resistant coatings may be applied directly onto the surface of the polycarbonate lamina of controlled thickness, or the surface of the polycarbonate lamina may first be primed with an adhesion promoting primer and the mar-resistant coatings may then be applied onto this primed surface.

The solid resinous materials which may comprise the laminae of laminates 6 and 21 may include epoxy, polyurethane, chlorinated aromatic ether, polyether sulfone, acrylic (polymethylmethacrylate) and rubber modified acrylics, polyarylsulfone, polystyrene, cellulose acetate butyrate, polyesters, bisphenol fluorenone polycarbonate, and phenol-phthalein based polycarbonate, among others.

Any polycarbonate resin can be used as laminae for the back laminate including but not limited to those described in U.S. Pat. Nos. 3,161,615; 3,220,973; 3,312,659; 3,312,660; 3,313,777; 3,666,614, among others, all of which are incorporated herein by reference.

Any conventional adhesives may be used between the laminae of the back and front laminates including polyvinylbutyrals, ethylene terpolymers, epoxies, polyurethanes, silicones, acrylics, and ethylene acrylic acids, among others. The interlayer in contact with any polycarbonate ply and most specifically the polycarbonate back-ply must provide not only good adhesion but also must be chemically compatible with the sensitive polycarbonate. The preferred interlayer for contact with the polycarbonate laminae is a polysiloxane-polycarbonate block copolymer.

The polysiloxane-polycarbonate block copolymers can be expressed by the average formula

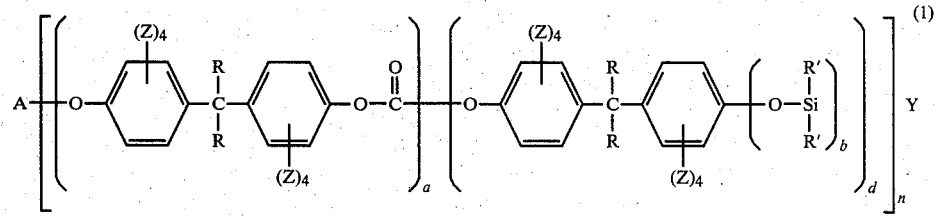

(1)

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is

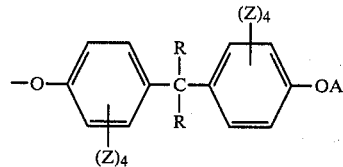

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonic acids, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably 20° C. to 50° C., and in the presence of an acid acceptor, a mixture of a halogen chain-stopped polydiorganosiloxane having the formula

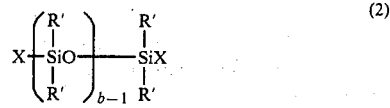

and a dihydric phenol having the formula

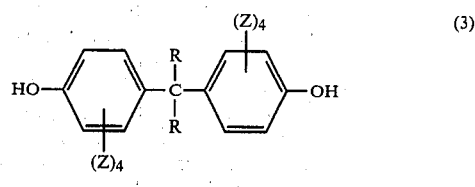

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 3 are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular desired characteristics.

Illustrative of the above block copolymers is General Electric LR-3320. This material has a specific gravity of 1.12, a tensile strength of 2500 to 3900 psi, an elongation of 230 to 430, a tear strength (Die C) of 400 lbs/in., and a brittleness temperature below −76° F. and a heat deflection temperature (10 mils under 66 psi Load) of 160° F.

Another such block copolymer, specifically General Electric LR-5530, has a specific gravity of 1.07, a tensile strength of 2200 to 2500 psi, an elongation of 500–700%, a tear (Die C) of 200 lbs/in., and a brittleness temperature below −76° F. and a heat deflection temperature (66 psi) of 130° F.

Where a polycarbonate layer without further description or designation is mentioned herein, it is the polycarbonate of bisphenol-A or 2,2-bis(4-hydroxyphenol) propane.

DESCRIPTION OF THE PREFERRED EMBODIMENT

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates the preparation of the back laminate of the double glazed structure. There were laminated in an autoclave using a standard edge bagging technique with a temperature of 142° C., a pressure of 100 psi, and a hold time of 20 minutes, a laminate containing a 125 mil thick front polycarbonate ply facing the direction of impact and coated on its exposed impact facing surface with a mar-resistant coating bonded by a 34 mil thick interlayer of LR-3320 polysiloxane-polycarbonate block copolymer to a 500 mil thick acrylic ply which is in turn bonded by a 34 mil thick interlayer of LR-3320 to a 188 mil thick polycarbonate ply which is in turn bonded by 34 mil thick interlayer of LR-3320 to a 125 mil thick back polycarbonate ply opposite the direction of impact having a mar-resistant coating on its exposed side opposite the direction of impact.

EXAMPLE 2

This example illustrates the preparation of a front glass laminate falling outside the scope of the instant invention. An intermediate glass ply having a thickness of 250 mils was bonded, in an autoclave using a standard edge bagging technique with a temperature of 135° C., a pressure of 100 psi, and a hold time of 20 minutes, on the surface thereof facing the direction of impact by a 34 mil thick interlayer of LR-3320 to a front impact receiving glass ply 375 mils thick, and bonded on the surface thereof opposite the direction of impact by a 34 mil thick interlayer of LR-3320 to a 125 mil thick back glass ply.

EXAMPLE 3

This Example illustrates the preparation of a front glass laminate falling outside the scope of the instant invention. An intermediate glass ply having a thickness of 250 mils was bonded, in an autoclave using a standard bagging technique with a temperature of 135° C., a pressure of 100 psi, and a hold time of 20 minutes, on the surface thereof facing the direction of impact by a 34 mil thick interlayer of LR-3320 to a front impact receiving glass ply 250 mils thick, and bonded on the surface thereof opposite the direction of impact by a 34 mil thick interlayer of LR-3320 to a 250 mil thick back glass ply.

EXAMPLE 4

This Example illustrates a double glazed structure falling outside the scope of the instant invention. A double glazed structure is constructed by placing the back laminate of Example 1 one-quarter inch behind or downstream of the front glass laminate of Example 2 with the laminate of Example 2 being nearest the direction of impact. Thus, the front glass laminate of Example 2 is separated from the back laminate of Example 1 by a ¼ inch air space.

EXAMPLE 5

This Example illustrates another double glazed structure falling outside the scope of the instant invention. A double glazed structure is constructed by placing the back laminate of Example 1 one-quarter inch behind or downstream of the front glass laminate of Example 3 with the laminate of Example 3 being nearest the direction of impact. Thus, the front glass laminate of Example 3 is separated from the back laminate of Example 1 by a ¼ inch air space.

EXAMPLE 6

This Example illustrates the preparation of a front glass laminate of the present invention. A front glass laminate was prepared by laminating in an autoclave using a standard edge bagging technique with a temperature of 135° C., a pressure of 100 psi, and a hold time of 20 minutes, a glass laminate containing an intermediate glass ply 375 mils thick bonded on the surface thereof facing the direction of impact by a 34 mil thick interlayer of LR-3320 to a front impact receiving glass ply 125 mils thick, and bonded on the surface thereof opposite the direction of impact by a 34 mil thick interlayer of LR-3320 to a 125 mil thick back glass ply.

EXAMPLE 7

This Example illustrates a double glazed structure of the present invention. A double glazed structure is constructed by placing the back laminate of Example 1 one-quarter inch behind or downstream of the front glass laminate of Example 6 with the laminate of Example 6 being nearest the direction of impact. Thus, the front glass laminate of Example 6 is separated from the back laminate of Example 1 by a ¼ inch air space.

EXAMPLE 8

This Example illustrates the preparation of a front glass laminate of the present invention. A front glass laminate was prepared by laminating in an autoclave using a standard edge bagging technique with a temperature of 135° C., a pressure of 100 psi, and a hold time of 20 minutes, a glass laminate containing an intermediate glass ply 500 mil thick bonded on the surface thereof facing the direction of impact by a 30 mil thick interlayer of polyvinylbutyral to a front impact receiving glass ply 125 mil thick, and bonded on the surface thereof opposite the direction of impact by a 30 mil thick interlayer of polyvinylbutyral to a 125 mil thick back glass ply.

EXAMPLE 9

This Example illustrates another double glazed structure of the present invention. A double glazed structure is constructed by placing the back laminate of Example 1 one-quarter inch behind or downstream of the front glass laminate of Example 8 with the laminate of Example 8 being nearest the direction of impact. Thus, the front glass laminate of Example 8 is separated from the back laminate of Example 1 by a ¼ inch air space.

All of the double glazed structures of Examples 4, 5, 7, and 9 were repeatedly shot from 10 meters with a 144 grain 7.62 mm NATO Round developing over 2,700 fps. The results of repeated hits upon these double glazed structures are set forth in Table I.

TABLE I

| Double Glazed Structure | Penetration Results Shot No. | | | | | | Spalling Results Shot No. | | | | | |
|---|---|---|---|---|---|---|---|---|---|---|---|---|
| Configuration - EXAMPLE | 1 | 2 | 3 | 4 | 5 | 6 | 1 | 2 | 3 | 4 | 5 | 6 |
| 4 | NP | NP | NP | P | P | P | NS | NS | S | — | — | — |
| 5 | P | NP | P | — | — | — | — | S | — | — | — | — |
| 7 | NP | NP | NP | NP | NP | NP | NS | NS | NS | NS | NS | NS |
| 9 | NP | NP | NP | NP | NP | NP | NS | NS | NS | NS | NS | NS |

In Table I, the symbol NP indicates no penetration; P indicates penetration; NS indicates no spalling, and S indicates spalling.

As can be clearly seen from Table I, the double glazed structures of the instant invention, i.e., those prepared in accordance with Examples 7 and 9, were resistant to penetration by six hits from a 7.62 mm rifle round, and further exhibited no spalling of the back of the double glazed structure. The double glazed structures falling outside the scope of the instant invention, i.e., those prepared in accordance with Examples 4 and 5, were not resistant to penetration upon repeat hits by a 7.62 mm rifle round. Furthermore, even where penetration of the structure by the round did not occur, spalling of the back face of the back laminate occurred.

It is interesting to note that the double glazed structure of Example 7 was superior to the structures of Examples 4 and 5 even though it was thinner than the structures of Examples 4 and 5, i.e., the combined thickness of the glass plies in the front glass laminate of the structure of Example 7 was 625 mils, while the combined thickness of the glass plies in the front glass laminates of the structures of Examples 4 and 5 was 750 mils.

This clearly demonstrates the criticality of using forward facing glass laminates with thin outer glass plies and a thick glass core in providing double glazed structures having improved performance with respect to being able to withstand repeat hits by high velocity.

It will be realized that the above examples are typical only of the practice of the invention. Thus, greater and lesser thickness of the various layers can be used where indicated. Likewise, while specific processes have been described in connection with the examples, generally speaking, other methods of laminating can be adapted to the making of the exemplary structures.

What I claim as new and desire to secure by Letters Patent of the United States is:

1. An impact resistant double glazed structure consisting essentially of, in combination, (i) a back laminate positioned opposite the direction of impact, said back laminate comprising a plurality of laminae selected from the group consisting of polycarbonate, glass and solid resinous materials, provided that at least one of said laminae is a polycarbonate lamina, said laminae being bonded together by a compatible adhesive; and (ii) a front glass laminate positioned forward of said back laminate respective to the direction of impact and spaced apart from said back laminate, said front laminate containing a plurality of glass laminae including a front glass lamina having a controlled thickness of from about 30 to about 220 mils facing and nearest to the direction of impact, a back glass lamina having a controlled thickness of from about 30 to about 220 mils opposite the direction of impact, and an intermediate glass core having a thickness greater than either said front glass lamina or said back glass lamina positioned between said front and back glass laminae, said front and back glass laminae being in surface to surface contact with said intermediate glass core and being bonded to said intermediate glass core by a compatible adhesive.

2. The structure according to claim 1 wherein said compatible adhesive is comprised of a block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

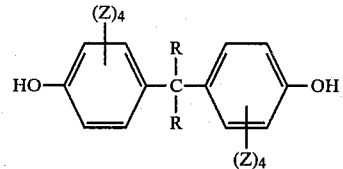

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product.

3. The structure according to claim 1 wherein said intermediate glass core disposed between said front and back glass laminae in said front laminate contains one glass lamina.

4. The structure according to claim 3 wherein said one glass lamina in said intermediate glass core has a thickness greater than the thickness of either said front or said back glass lamina.

5. The structure according to claim 4 wherein said one glass lamina in said intermediate glass core has a thickness greater than about 250 mils.

6. The structure according to claim 1 wherein said intermediate glass core has a thickness greater than about 250 mils.

7. The structure according to claim 1 wherein the surface of the lamina in said back laminate facing the direction of impact is adjacent to and in contact with the surface of said back glass lamina of said front laminate.

8. An impact resistant double glazed structure consisting essentially of, in combination, (i) a back laminate positioned opposite the direction of impact, said back laminate comprising a plurality of laminae selected from the group consisting of polycarbonates, glasses, and solid resinous materials, including a back polycarbonate lamina opposite the direction of impact, said back polycarbonate lamina having on its exposed surface opposite the direction of impact a mar-resistant coating less than 2 mils thick which is harder and relatively more brittle than the underlying polycarbonate layer, said back polycarbonate lamina having a controlled thickness of from about 30 mils to about 220 mils, the laminae being bonded together by a compatible adhesive; and (ii) a front glass laminate positioned forward of said back laminate respective to the direction of impact and spaced apart from said back laminate, said front laminate containing a plurality of glass laminae, including a front glass lamina having a controlled thickness of from about 30 to about 220 mils facing and nearest to the direction of impact, a back glass lamina having a controlled thickness of from about 30 to about 220 mils opposite the direction of impact, and an intermediate glass core having a thickness greater than either said back glass lamina or said front glass lamina positioned intermediate said front and said back glass laminae, said front and back glass laminae being in surface to surface contact with said intermediate glass core and being bonded to said intermediate glass core by a compatible adhesive.

9. The structure according to claim 8 wherein said compatible adhesive is comprised of a block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

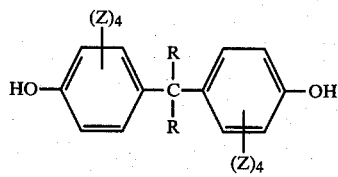

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product.

10. The structure according to claim 8 wherein said intermediate glass core disposed intermediate said front and back glass laminae in said front glass laminate contains one glass lamina.

11. The structure according to claim 10 wherein said one glass lamina in said intermediate glass core has a thickness greater than the thickness of either said front or said back glass lamina.

12. The structure according to claim 11 wherein said one glass lamina in said intermediate glass core has a thickness greater than about 250 mils.

13. The structure according to claim 8 wherein said intermediate glass core positioned intermediate said front and back glass laminae in said front laminate comprises a plurality of glass laminae, said plurality of glass laminae being bonded to each other by means of a compatible adhesive.

14. The structure according to claim 13 wherein said inner glass core has a thickness greater than about 250 mils.

15. An impact resistant double glazed structure consisting essentially of, in combination, (i) a back laminate positioned opposite the direction of impact, said back laminate containing a plurality of laminae selected from the group consisting of polycarbonate, glass and solid resinous materials, provided that at least one of said laminae is a polycarbonate lamina, said laminae being bonded together by a compatible adhesive; and (ii) a front glass laminate positioned forward of said back laminate respective to the direction of impact and consisting essentially of a front glass lamina having a controlled thickness of from about 30 to about 220 mils facing and nearest to the direction of impact, a back glass lamina having a controlled thickness of from about 30 to about 220 mils opposite the direction of impact, and an intermediate glass core having a thickness greater than either said front glass lamina or said back glass lamina positioned between said front and said back glass laminae, said front and back glass laminae being in surface to surface contact with said intermediate glass core and being bonded thereto by a compatible adhesive, the surface of said back laminate facing and nearest to the direction of impact being adjacent to and in unbounded surface to surface contact with the surface opposite the direction of impact of the back glass lamina of said front glass laminate.

16. The structure according to claim 15 wherein said intermediate glass core disposed between said front and back glass laminae in said front laminate contains one glass lamina.

17. The structure according to claim 16 wherein said one glass lamina in said intermediate glass core has a thickness greater than the thickness of either said front or said back glass lamina.

18. The structure according to claim 17 wherein said one glass lamina in said intermediate glass core has a thickness greater than about 250 mils.

19. The structure according to claim 15 wherein said intermediate glass core positioned between said front and back glass laminae in said front laminate comprises a plurality of glass laminae, said plurality of glass laminae being bonded to each other by means of a compatible adhesive.

20. The structure according to claim 19 wherein said inner glass core has a thickness greater than about 250 mils.

21. An impact resistant double glazed structure consisting essentially of, in combination, (i) a back laminate positioned opposite the direction of impact, said back laminate containing a plurality of laminae selected from the group consisting of polycarbonates, glasses and solid resinous materials, and including a back polycarbonate lamina opposite the direction of impact, said back polycarbonate lamina having on its exposed surface opposite the direction of impact a mar-resistant coating less than about 2 mils thick which is harder and relatively more brittle than the underlying polycarbonate layer, said back polycarbonate lamina also having a thickness of from about 30 to about 220 mils, the laminae of said back laminate being bonded together by a compatible adhesive; and (ii) a front glass laminate positioned forward of said back laminate respective to the direction of impact and consisting essentially of a front glass lamina having a controlled thickness of from about 30 to about 220 mils facing and nearest to the direction of impact, a back glass lamina having a controlled thickness of from about 30 to about 220 mils opposite the direction of impact, and an intermediate glass core having a thickness greater than either said back glass lamina or said front glass lamina positioned intermediate said front and back glass laminae, said back and front glass laminae being in surface to surface contact with said intermediate glass core and being bonded thereto by a compatible adhesive, the surface of said back laminate facing and nearest to the direction of impact being adjacent to and in unbonded surface to surface contact with the surface opposite the direction of impact of said back glass lamina of said front glass laminate.

22. The laminated structure according to claim 21 wherein said intermediate glass core disposed intermediate said front and back glass laminae in said front laminate contains one glass lamina.

23. The laminated structure according to claim 22 wherein said one glass lamina in said intermediate glass core has a thickness greater than the thickness of either said front or said back glass lamina.

24. The laminated structure according to claim 23 wherein said one glass lamina in said intermediate glass core has a thickness greater than about 250 mils.

25. The laminated structure according to claim 21 wherein said intermediate glass core positioned intermediate said front and back glass laminae in said front laminate comprises a plurality of glass laminae, said plurality of glass laminae being bonded to each other by means of a compatible adhesive.

26. The laminated structure according to claim 25 wherein said intermediate glass core has a thickness greater than about 250 mils.

27. An impact resistant double glazed structure consisting essentially of, in combination, (A) a back laminate positioned opposite the direction of impact, said back laminate comprised of (i) a back polycarbonate lamina opposite the direction of impact having a controlled thickness of from about 30 mils to about 220 mils and having on its exposed surface opposite the direction of impact a mar-resistant coating less than about 2 mils thick which is harder and relatively more brittle than the underlying polycarbonate layer, (ii) a second polycarbonate lamina positioned forward of said back polycarbonate lamina respective to the direction of impact, (iii) an acrylic lamina positioned forward of said second polycarbonate lamina respective to the direction of impact, and (iv) a front polycarbonate lamina facing the direction of impact positioned forward of said acrylic lamina, said laminae of said back laminate being bonded together by a compatible adhesive; and (B) a front glass laminate positioned forward of said back laminate respective to the direction of impact and spaced apart from said back laminate and consisting essentially of (i) a front glass lamina having a controlled thickness of from about 30 to about 220 mils facing and nearest to the direction of impact, (ii) a back glass lamina having a controlled thickness of from about 30 to about 220 mils opposite the direction of impact, and (iii) an intermediate glass lamina having a thickness greater than either said front glass lamina or said back glass lamina positioned intermediate said front and back glass laminae, said front glass lamina and said back glass lamina being adjacent to and in surface to surface contact with said intermediate glass lamina and being bonded thereto by a compatible adhesive.

28. The structure according to claim 27 wherein said front polycarbonate lamina in said back laminate has a thickness of from about 30 to about 220 mils.

29. The structure according to claim 28 wherein said front polycarbonate lamina of said back laminate has on its exposed surface facing the direction of impact a mar-resistant coating less than about 2 mils thick which is harder and relatively more brittle than the underlying polycarbonate layer.

* * * * *